United States Patent [19]
Gerbel et al.

[11] 3,986,207
[45] Oct. 12, 1976

[54] APPARATUS FOR RECORDING IN A DIGITAL FORM SIGNALS DETECTED DURING MAGNETO-TELLURIC PROSPECTION

[75] Inventors: Lucien Gerbel; Michel Waeselynck, both of Pau, France

[73] Assignee: Societe Anonyme dite: Societe Nationale des Petroles d'Aquitaine, Courbevoie, France

[22] Filed: May 19, 1975

[21] Appl. No.: 579,021

[30] Foreign Application Priority Data
May 21, 1974 France .............................. 74.17606

[52] U.S. Cl. ....................................... 360/6; 324/8
[51] Int. Cl.² .................... G11B 5/00; G01D 15/12; G01V 3/12
[58] Field of Search ................... 360/6, 39; 324/7, 8, 324/9; 325/187

[56] References Cited
UNITED STATES PATENTS

| | | | |
|---|---|---|---|
| 3,320,803 | 5/1967 | Lord | 360/6 |
| 3,360,774 | 12/1967 | Smith | 360/6 |
| 3,388,375 | 6/1968 | Sloughter | 360/6 |
| 3,849,722 | 11/1974 | Nilsson | 324/9 |

Primary Examiner—Jay P. Lucas
Attorney, Agent, or Firm—Bacon & Thomas

[57] ABSTRACT

A recording apparatus for recording digital signals corresponding to components of telluric and magnetic fields. The apparatus comprises an analog input stage, a low pass filter stage, an analog output stage, an analog multiplexer and an analog-to-digital converter and recording system for recording the digital signals. A gain computing module is provided as well as a recording selector to achieve variable amplification gains in the analog input and output stages as well as variable frequency bands in the low pass filtering stage to accommodate different frequency input signals for low frequency recording, intermediate frequency recording and high frequency recording.

11 Claims, 5 Drawing Figures

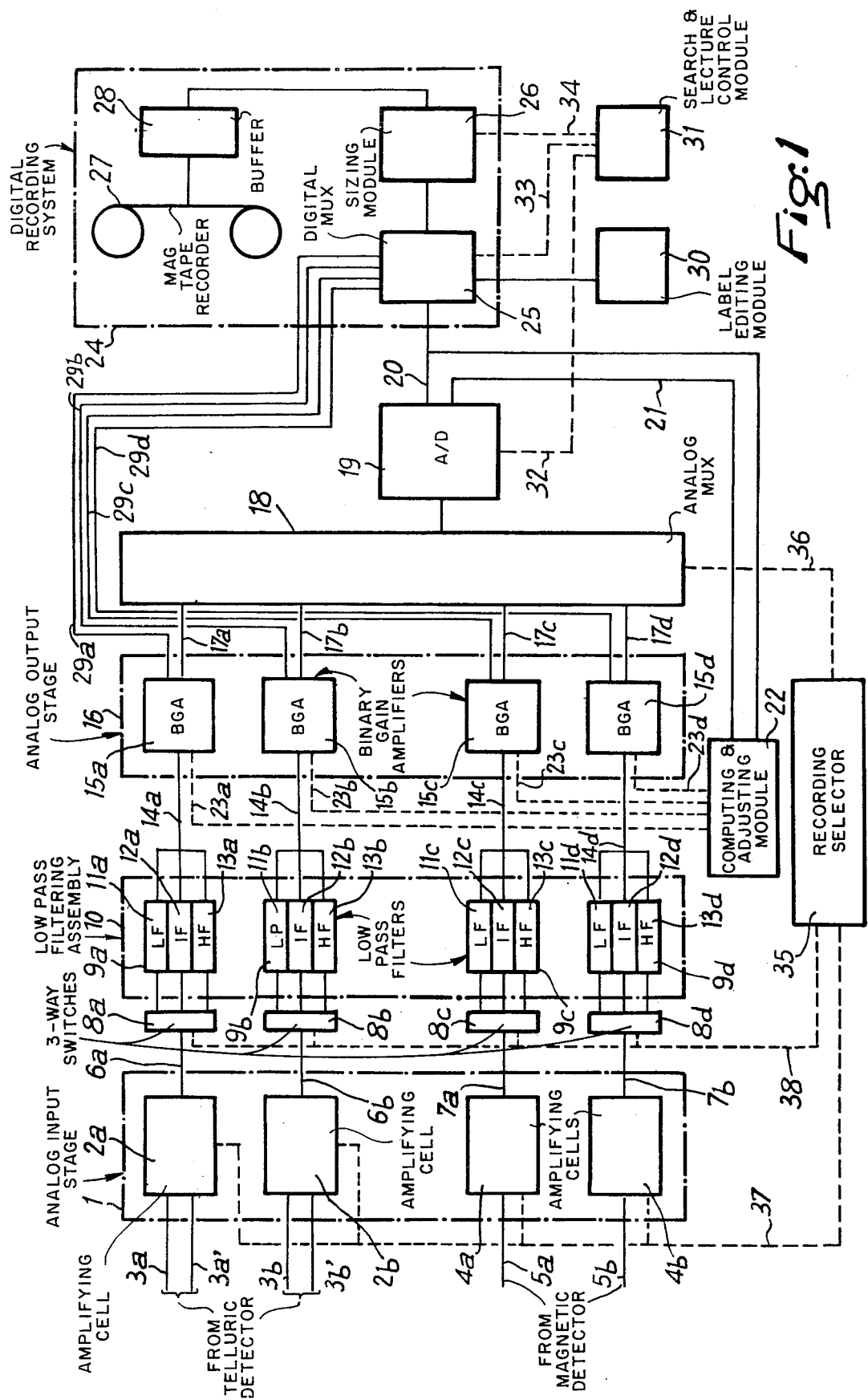

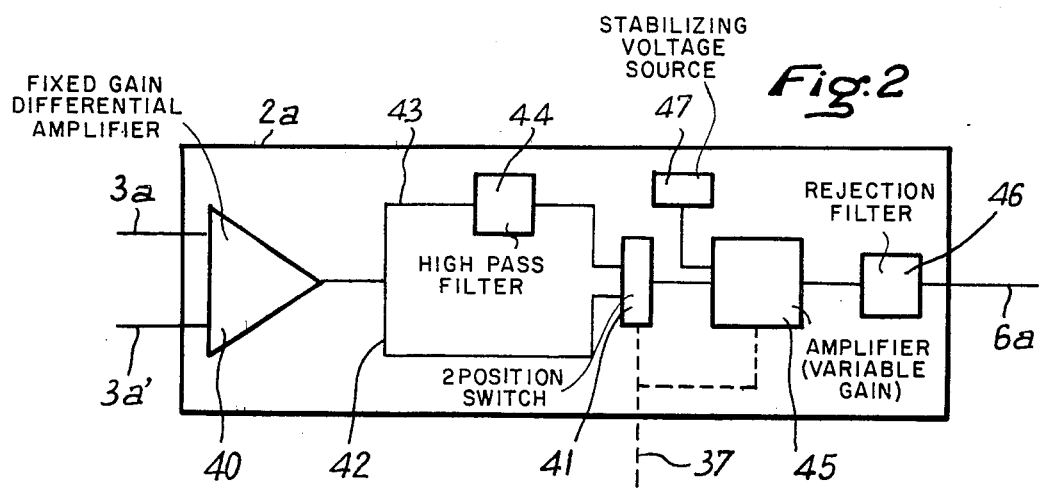
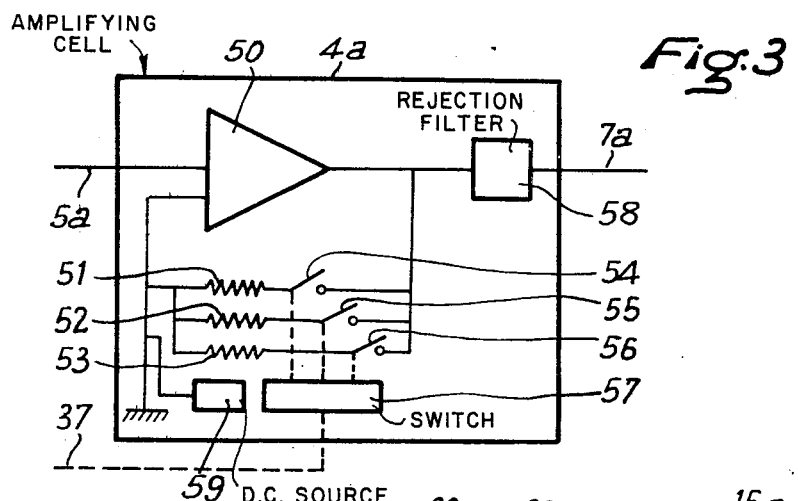
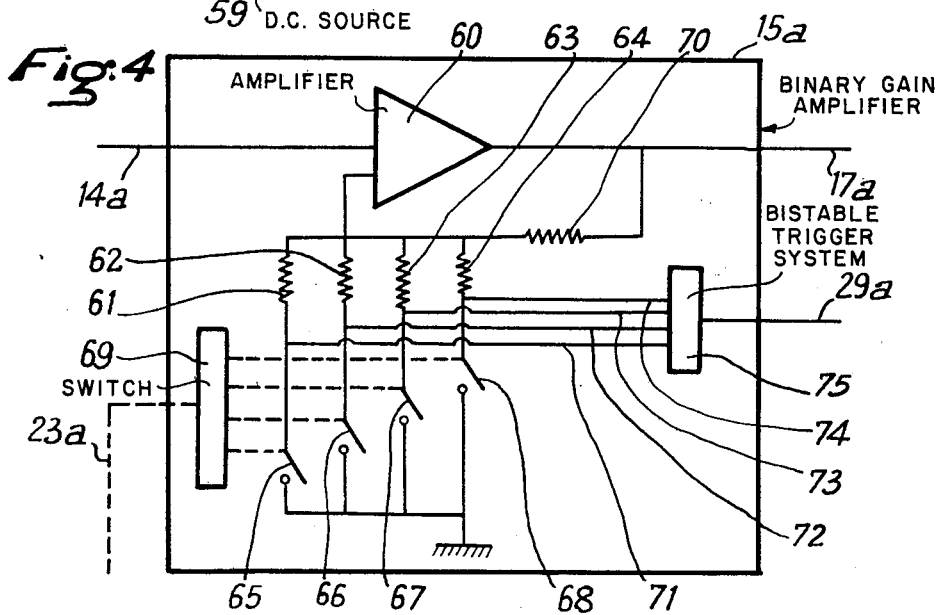

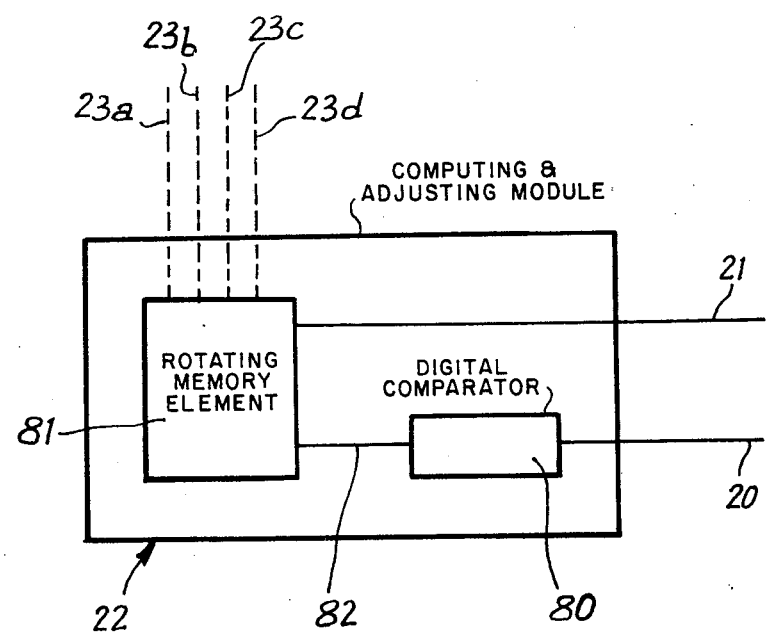

APPARATUS FOR RECORDING IN A DIGITAL FORM SIGNALS DETECTED DURING MAGNETO-TELLURIC PROSPECTION

This invention concerns an apparatus for recording in a digital form signals representing the simultaneous variations of the electric field and the magnetic field created by the flow of telluric currents and detected during the magneto-telluric prospection of the sub-soil.

It is known that electromagnetic induction phenomena are generated in the soil by the natural electromagnetic variations the location and the origin of which are placed above the soil in the atmosphere and the ionosphere of the earth. It has been discovered that the relations which exist between the orthogonal horizontal pairs of components of the electric and magnetic fields at the surface of the soil or at a certain level under the surface of the soil depend only on the value of the electric resistivity of the zone of the soil located beneath the said surface or the said level.

The term of "magnetotelluric prospection of the sub-soil" designates the geophysical prospection technique which consists in obtaining information about the electric resistivity of the soil at various depths, by means of simultaneous recording of the variations of the magnetic field on the one hand and the telluric field on the other hand, said recordings being effected at the surface of the soil.

The apparatus used for carrying out the method of magnetotelluric prospection generally comprises a telluric detector or a group of two telluric detectors (detection of the component of the telluric electric field) preferably arranged in accordance with two orthogonal directions, each one of said detectors being located in a substantially horizontal plane and being constituted by two burried electrodes separated by a distance comprised between about 100 meters and several kilometers, said electrodes constituting the ends of an isolated electric line which is called telluric line, said apparatus further comprising 1, 2 or even 3 magnetic detectors (detection of the components of the magnetic field), more particularly magnetometric detectors, two of which are located in horizontal planes, while a recording installation is connected to each one of said magnetic detectors through the intermediary of a line which is called "magnetic line".

The signals representing the components of the magnetic and telluric fields have frequencies which, in the petro-magnetotelluric domain may vary from 0.001 to 120 Hz; this leads to effect three types of recording: i.e.: low frequency (on the order of 0.001 to 1 Hz), intermediate frequency (on the order of 0.3 to 20 Hz) and high frequency (on the order of 3 to 120 Hz).

The recording installations currently used for recording magnetotelluric signals on the ground comprise two types of apparatus, one of which allows low frequency signals to be recorded in a digital form whereas the other one allows intermediate and high frequency signals to be recorded in an analog form. Such recording installations are comparatively complex due to the fact that they comprise digital recording means as well as analog recording means. Furthermore, it is necessary to transform at the processing center the recorded analog data into digital data, which entails a supplementary loss of time and an increase of the processing cost.

The present invention has for its object an improved recording installation adapted to record automatically on the ground and in an entirely digital form the signals produced by the telluric and magnetic detectors during the magnetotelluric prospection of the sub-soil, said recording installation thus allowing the drawbacks and disadvantages of the known devices to be eliminated.

The recording installation according to the invention for automatically recording in an entirely digital form signals which represent components of telluric and magnetic fields and which are produced by telluric and magnetic detectors during the magnetotelluric prospection of the sub-soil comprises:

an analog input stage comprising at least as many amplifying cells as telluric and magnetic detectors, those amplifying cells which are associated with the telluric detectors comprising each a fixed gain differential amplifier connected to the corresponding telluric detector by the associated telluric line, whereas the amplifying cells associated to the magnetic detectors comprise each a non-differential amplifier the gain of which is adjustable in accordance with the frequency range of the signals to be recorded, said non-differential amplifier being connected by the associated line to the outlet of the corresponding magnetic detector;

a low-pass filter stage comprising filtering cells in a number equal to the number of amplifying cells present in the analog inlet stage, each one of said filtering cells comprising a shunted low frequency low-pass filter, a shunted intermediate frequency low pass filter and a shunted high frequency low pass filter, each one of said filters having a predetermined cut-off frequency, the respective inlets of the low pass filters of a given filtering cell being sequentially connected to the outlet of the corresponding amplifying cell of the analog inlet stage through the intermediary of switching means;

an analog output stage comprising programmable binary gain amplifiers in a number equal to the number of the filtering cells, each one of said binary gain amplifiers being connected to the outlet of the corresponding filtering cell and producing an amplified signal and a digital signal representing the true value of the applied binary gain;

a multiplexer having an adjustable variable sampling sequence comprising input channels in a number at least equal to the number of binary gain amplifiers, the outlet of each one of said amplifiers being connected to one of said input channels of said multiplexer;

an analog-digital converter the inlet of which is connected to the outlet of the multiplexer and which produces a first signal representing in a digital form the amplitude of the analog sample received by the multiplexer, and a second signal representing the address of the channel of the multiplexer from which the sample issues;

a gain computing module receiving each one of the signals produced by the analog-digital converter and producing for each one of the binary gain amplifiers the actual value of the gain and transmitting to said amplifiers an optimum gain order for putting the amplifier concerned in a condition of optimum gain;

a digital recording system receiving a first digital signal from the analog-digital converter and the digital signal produced for each one of the binary gain amplifiers, and a recording selector connected to the multiplexer, at least to the non-differential amplifiers of the analog input stage, as well as to the different filtering cells of the filtering stage, said selector being adapted to select for each one of the various recording types comprising low frequency recording, intermediate frequency recording and high frequency recording, the sampling frequency of the multiplexer, the gain of the non differential amplifiers of the analog input stage, and the appropriate low pass filter of each filtering cell.

In one particular embodiment of the recording installation according to the invention, the digital recording system comprises a digital multiplexer receiving the signals produced by the analog converter and the gain signal produced by each one of the binary gain amplifiers, while a sizing module is connected to the outlet of the digital multiplexer, and a magnetic tape recorder receives the information produced by the sizing module through the intermediary of a buffer-memory.

This digital recording system may be associated to a label editing module allowing each recording to be preceded by a distinctive code, said label editing module being connected to the digital multiplexer of the recording system.

This digital recording system may also be associated to a scanning and reading control module which allows a recording to be found on the tape of the tape recorder by means of the number of its label, which enables then to read said recording or to put the tape into a position corresponding to the end of said recording said module being connected to the digital multiplexer and to the sizing module of the recording system, as well as to the analog digital converter, the functions of which are reversible. This feature is advantageous in that it allows the tape to be positioned with a view to effecting a new recording without altering the preceding recording.

In an advantageous embodiment of the recording installation according to the invention the differential amplifier of each amplifying cell of the analog input stage connected to a telluric detector comprises a direct outlet and an outlet through a high-pass filter having a predetermined cut-off frequency, and a non-differential amplifier the gain of which is adjustable in accordance with the frequency range of the recording which has been effected, said amplifier being connected by the intermediary of a switching organ to the direct outlet of the differential amplifier for the low-frequency recording, and to the outlet of the high-pass filter for the intermediate and high frequency recording, the outlet of said non-differential amplifier being connected to the outlet of the corresponding low-pass filtering cell, and said switching organ, as well as the adjustment of the gain of said non-differential amplifier being controlled by the recording selector.

In this embodiment it is also possible to compensate any unbalance which may initially exist between the telluric detectors, by connecting the inlet of said non-differential amplifier to a stabilized voltage direct current source (expecially a battery or a direct current source the voltage of which is stabilized by Zener diodes), said connection being effected through the intermediary of a manually controlled switch or through the intermediary of the recording selector.

Similarly any initial unbalance of the magnetic detector may be compensated by connecting the outlet of the non-differential amplifier of the amplifying cell connected to the said magnetic detector to a source of electric current having a stabilized voltage, said connection being effected through the intermediary of a manually controlled switch or through the intermediary of the recording selector.

Although the nature of the low-pass filters constituting the low-pass filtering cell of the recording installation according to the invention is not critical, said low-pass filters may, in particular, be constituted by active filters, i.e. filters the circuits of which include no inductive elements and comprise operational amplifiers.

The recording installation according to the invention may comprise a series of band cut-off filters adapted to eliminate or attenuate the signals having a frequency of 50 or 60 Hz, said filters being arranged at the outlet of each amplifying cell of the analog input stage, and before the switching means associated to each corresponding filtering cell.

The invention will be better understood from the description hereinafter of an embodiment of the digital recording installation according to the invention, which description is given by way of example but not of limitation, said description referring to the appended drawings, wherein:

FIG. 1 is a block diagram showing the above-mentioned recording installation.

FIG. 2 is a block diagram of an amplifying cell of the analog input stage connected to the outlet of a telluric detector through the associated telluric line.

FIG. 3 shows schematically an amplifying cell of the analog input stage connected to the outlet of a magnetic detector.

FIG. 4 is a diagram showing one of the binary amplifiers of the analog output stage, and FIG. 5 is a block diagram of the computing and adjusting module for adjusting the binary gain of the binary gain amplifiers of the analog output stage of the recording installation.

The recording installation according to FIG. 1 comprises an analog input stage 1 including two amplifying cells 2a and 2b connected each to the outlet of a telluric detector (not shown) through the intermediary of two sections of the corresponding telluric line, to wit: sections 3a and 3a' as regards cell 2a, and sections 3b and 3b' as regards cell 2b, as well as two amplifying cells 4a and 4b connected each to the outlet of a magnetic detector (not shown) through the intermediary of the associate lines 5a and 5b. The outlets of the amplifying cells of the analog input stage, i.e. in the present embodiment the output terminals 6a and 6b of cells 2a and 2b, and the output terminals 7a and 7a of cells 4a and 4b, are connected, respectively, by three-way switches 8a, 8b, 8c, 8d each to a low-pass filtering cell 9a, 9b, 9c, 9d (respectively) of a low-pass filtering assembly 10. Each low-pass filtering cell 9a, 9b, 9c, 9d comprises a low frequency low-pass filter, 11a, 11b, 11c, 11d (respectively) an intermediate frequency low-pass filter 12a, 12b, 12c, 12d (respectively) and a high frequency low-pass filter 13a, 13b, 13c, 13d (respectively). The inlets of the filters of each low-pass filtering cell are connected to the three-way switch associated to the said filtering cell. The respective outlets 14a, 14b, 14c, 14d of the low-pass filtering cells are connected each to an associated binary gain amplifier 15a, 15b, 15c, 15d (respectively), said binary gain amplifiers constituting the analog output stage 16. Each binary gain amplifier outlet 17a, 17b, 17c, 17d (respectively) is connected to an input channel of the multiplexer 18 having an adjustable sampling sequence, said multiplexer feeding analog samples to an analog-digital converter 19 comprising a first outlet 20 for the digital samples and a second outlet 21 for a signal representing the address of the multiplexer channel transmitting the sample. Each one of the output terminals of the analog-digital converter is connected to the inlet of a computing and adjusting module 22 adapted to compute and adjust the gain of the binary gain amplifiers, said module transmitting an optimum gain order to each one of the binary gain amplifiers, through the intermediary of conductors 23a, 23b, 23c, 23d (respectively), said optimum gain order being adapted to put the amplifier concerned in a condition of optimum gain. The analog-digital converter is also connected to a digital recording system 24 comprising a digital multiplexer 25 connected to a sizing module 26 which is connected in turn to a magnetic tape recorder 27 through the intermediary of a buffer memory 28, said connection being effected by connecting the output terminal 20 of said analog-digital converter to the input terminal of the digital multiplexer of the digital recording system. Said digital multiplexer also receives from each one of the binary gain amplifiers a signal 29a, 29b, 29c, 29d (respectively) representing the value of the binary gain to be associated to each digital sample.

A label editing module 30 is connected to the digital multiplexer; said module which may be of the manually controlled type or of the automatically controlled type allows each recording to be preceded by a distinctive code.

A search and lecture control module 31 connected to the analogdigital converter by a conductor 32, to the digital multiplexer by a conductor 33, and to the sizing module by a conductor 34 allows the different labels recorded on the tape of the recorder 27 to be read and said tape to be positioned in accordance with a selected label number, whereafter said tape may be decoded sign by sign and channel by channel, and then, after the last recording and prior to effecting new measurements, to be placed in such a position that the next recording will not alter the preceding recordings.

A recording selector 35 connected to the multiplexer 18 by a conductor 36 to each of the amplifying cells of the analog input stage by a conductor 37, and to the switches arranged at the inlet of the low-pass filtering cells by a conductor 38 effects for each selected recording mode (low frequency, intermediate frequency, high frequency) the selection of the sampling sequency of multiplexer 18, the selection of the gain of each amplifying cell of the analog input stage 1, and the selection of the low-pass filter of each low-pass filtering cell of the low-pass filtering stage 10.

FIG. 2 shows the diagram of an amplifying cell of the analog input stage, which cell is associated to a telluric detector; this diagram refers to cell 2a. Sections 3a and 3a' of the telluric line connecting said cell to the corresponding telluric detector (not shown) are connected to each one of the inlets of a fixed gain differential amplifier 40 the outlet of which is connected to a two-position switch 41 controlled by the signal 37 issuing from the selector 35 which is shown in FIG. 1. This connection is effected either directly by a conductor 42 (low frequency recording), or indirectly by a conductor 43 through the intermediary of a high-pass filter 44, the cut-off frequency of which is selected with a view to eliminating the low frequency portion of the signal transmitted by conductor 43 (intermediate frequency recording and high frequency recording). Switch 41 is connected to an amplifier 45 the gain of which can be adjusted in accordance with the selected mode of recording, the gain variation of said amplifier being also controlled by the signal 37 issuing from the selector 35.

Amplifier 45 is followed by a rejection filter 46 adapted to eliminate the portion of the signal the frequency of which is 50 or 60 Hz, the outlet of said filter constituting the outlet 6a of the amplifying cell 2a. A stabilized voltage source 47 may be connected to the inlet of the non-differential amplifier 45 through the intermediary of a manually controlled switch (not shown) so as to allow to compensate any unbalance of the telluric detector associated to amplifying cell 2a.

Referring to FIG. 3 which shows the detail of amplifying cell 4a of the analog input stage connected to a magnetic detector, it will be seen that conductor 5a connects the outlet of said detector to the inlet of a non-differential amplifier 50 the gain of which can be adjusted to one of three values corresponding, respectively, to the selected recording mode (low frequency, intermediate frequency, high frequency), said adjustment being effected by the commutation of one of three counter-reaction resistances 51, 52, 53, through the intermediary of an associated interrupter 54, 55, 56 (respectively) actuated by a switch 57 which is controlled by the signal 37 issuing from the recording selector 35. A band-cutting filter is arranged at the outlet of amplifier 50 and adapted to eliminate from the amplified signal the portion having a frequency of 50Hz. The outlet of said band-cutting filter constitutes the outlet 7a of the amplifying cell 4a. A stabilized direct current source 59 may be also connected to the outlet of amplifier 50 by a manually controlled switch (not shown), with a view to compensating any unbalance of the magnetic detector associated to amplifying cell 4a.

The adjustable binary gain amplifiers 15a, 15b, 15c, 15d which constitute the analog output stage 16 are more particularly described with reference to FIG. 4 which shows schematically the amplifier 15a. Said amplifier 15a comprises an amplifier 60 properly speaking which is connected by conductor 14a to the outlet of the low-pass filtering cell 9a of the low-pass filtering stage 10, said amplifier 60 having a gain which may be varied by the commutation of one of the resistances 61, 62, 63 and 64, through the intermediary of an associated interrupter 65, 66, 67, 68 (respectively) actuated by a switch 69 which is controlled by the gain computing module 22 through conductor 23a. The resistors 61, 62, 63, 64 and resistor 70 have predetermined values so that the gain of amplifier 60 is equal to 1 when none of the resistors 61, 62, 63, 64 are commutated, and that said gain reaches respective values of 2, 4, 8, 16 when resistors 61, 62, 63, 64 are commutated, respectively. The commutation of each resistor 61 to 64 is detected through a corresponding conductor 71, 72, 73, 74 by a bistable trigger system 75 which produces a signal 29a representing the address of the commutated resistor and, consequently, the value of the binary gain, said signal being transmitted to the multiplexer 25 which forms a part of the recording system 24. The outlet of amplifier 60 constitutes the outlet 17a of the binary gain amplifier 15a connected to multiplexer 18.

As indicated in the diagram of FIG. 5, the module 22 for computing and adjusting the gain of the binary gain amplifiers of the analog output stage 16 comprises a digital comparator 80 associated to a rotating memory element 81. The inlet of the digital comparator is connected to the first outlet 20 of the analog-digital converter 19, whereas the rotating memory component has a first inlet connected directly to the second outlet of the converter (outlet 21) and a second inlet connected to the outlet of the digital comparator through the intermediary of a conductor 82. The outlet of component 81 is connected to the gain adjusting system of each one of the binary gain amplifiers 15a, 15b, 15c, 15d of the output stage 16, through respective associated conductors 23a, 23b, 23c, 23d.

The digital comparator 80 weighs at a gain of the value 1 each digital sample which is transmitted to the comparator by the analog-digital converter and determines the gain to be applied with a view to obtaining at the corresponding input channel of multiplexer 18 a signal having the appropriate amplitude; the comparator then transmits to the memory of organ 81 the indication of the thus determined gain. In addition to this gain value indication issuing from the digital comparator the rotating memory also receives from the analog-digital converter 19 the address of the channel of the multiplexer from which the digital sample transmitted to the digital comparator has issued. Organ 81 then identifies the binary gain amplifier associated to the channel of multiplexer 18 which corresponds to the address received, and transmits to said amplifier through the associated conductor an order adapted to put the amplifier into a condition wherein the gain corresponds to the value determined by the digital comparator.

For example, when the digital sample issues from channel 17a corresponding to binary gain amplifier 15a, the organ 81 identifies said amplifier on the basis of the address received from the analogdigital converter, and transmits to this binary gain amplifier 15a through the associated conductor 23a an order received by the switch 69 of said amplifier, for commutating the appropriate resistor, for instance resistor 62, if the gain has to be adjusted to the value 4.

The digital recording installation described hereinabove operates as follows:

At the start the telluric detectors (not shown) are connected by the telluric lines 3a, 3a' and 3b, 3b' to the corresponding amplifying cells 2a and 2b, while the magnetic detectors (not shown either) are connected through the intermediary of conductors 5a and 5b to the amplifying cells 4a and 4b of the analog input stage 1.

The recording selector 35 is set in accordance with the selected recording mode (low frequency, intermediate frequency, high frequency). In the description hereinafter the case where the low frequency recording mode was selected will be considered. Selector 35 selects the sampling sequency of multiplexer 18 and commutates on the one hand the low frequency low-pass filters 11a, 11b, 11c, 11d of the low-pass filtering cells 9a, 9b, 9c, and 9d of the low-pass filtering stage 10 through the intermediary of the associated switches 8a, 8b, 8c and 8d, and on the other hand the circuits of amplifying cells 2a, 2b, 4a and 4b of the analog input stage 1, corresponding to the low-frequency recording mode.

The signals produced by the various telluric and magnetic detectors succsessively pass through the amplifying cells 2a, 2b, 4a and and 4b (respectively) then through the correspondoing low frequency low-pass filters 11a, 11b, 11c, 11d (respectively) and are received by the associated binary gain amplifier 15a, 15b, 15c and 15d of the analog output stage 16, the gain of each one of the binary gain amplifiers being adjusted to a value of 1 at the beginning of the operation (no commutation of resistors 61, 62, 63 and 64).

The analog signals issuing from the binary gain amplifiers 15a, 15b, 15c and 15d (respectively) through conductors 17a, 17b, 17c and 17d (respectively) are periodically sampled by the multiplexer 18 in accordance with the sampling sequence determined by the recording selector, each sampling cycle comprising two phases. In a first phase the four analog samples each of which is taken by multiplexer 18 from the output signal of one of the binary gain amplifiers adjusted to a gain value of 1, and which is converted into a digital sample by the analog digital converter 19, are transmitted to the gain computing module 22, together with the signal 21 representing the address of the input channel of the multiplexer from which the sample has issued. The gain computing module compares the digital value of each one of the four samples to a predetermined value (full scale or half scale) corresponding to the obtention of an appropriate amplitude signal at the inlet of multiplexer 18, so as to ensure a correct operation of the latter.

After this comparison the gain computing module determines for each binary gain amplifier 15a, 15b, 15c and 15d the resistor of type 61, 62, 63 and 64 which must be commutated with a view to obtaining the appropriate value of the gain, and said computing module actuates through the appropriate conductor 23a, 23b, 23c and 23d the switch of type 69 which commutates the approriate resistor by actuating the corresponding interrupter. For instance, when the value of the gain of binary gain amplifier 15a has to be adjusted to 4, module 22 transmits through conductor 23a a contral signal to switch 69, causing the latter to commutate resistor 62 by closing interrupter 66. The commutation of the corresponding resistor in accordance with the binary gain determined by module 22 for each one of amplifiers 15a, 15b, 15c and 15d is detected by the bistable trigger system corresponding to system 75 for amplifier 15a, and a signal representing the abovementioned value of the binary gain is produced by each one of said amplifiers 15a, 15b, 15c and 15d and transmitted by conductors 29a, 29b, 29c and 29d, respectively.

In the second phase of the sampling cycle, which takes place several hundred of micro-seconds after the first phase, so as to allow the binary gain amplifiers adjusted to an optimum gain value by module 22 to be stabilized, the multiplexer takes up a second series of four analog samples which, after conversion into digital samples, are transmitted by conductor 20 to the digital multiplexer 25 of the recording system 24, said digital multiplexer also receiving through conductors 29a, 29b, 29c and 29d the binary gain values corresponding to each one of said samples. The digital samples and the corresponding binary gain values are transmitted by digital multiplexer 25 to the sizing module 26 where they are arranged in the form of blocks having a selected length, prior to being transmitted to the magnetic tape recorder 27 through the intermediary of the buffer memory 28. This buffer memory controls the actuation of the magnetic tape recorder and thus allows any discontinuity of the information recorded on the magnetic tape of recorder 27 to be avoided.

Label editing module 30 is actuated at the beginning and at the end of the magnetic recording operation and transmits to digital multiplexer 25 a series of digital data constituting a distinctive code corresponding to said recording. The digital multiplexer transmits these data to the sizing module 26 which transmits them, after putting them in shape, to the magnetic tape recorder, thhrough the intermediary of the buffer memory.

The label editing module may be actuated manually or automatically. In this latter case the control order may be given by selector 35.

The above-mentioned distinctive code is constituted by a block having the same size as that of the data blocks, and it comprises a recording number as well as various information data which are repreated a predetermined number of times and completed by zeros so as to correspond to the conventional size of the data blocks. The initial recording number is 1 for a new tape and is automatically incremented of one unit by the label editing module each time a new recording is started. As regards the remaining information data comprised in the distinctive code, these may concern, inter alia, the date of the recording, the description of the installation used for the prospection (number of telluric lines and/or number of magnetometers, etc.) whereby it is possible to avoid, during the data processing operations, the preparation of punched cards with a view to determining the true signals obtained during the prospection operations.

When it is desired to recover a recording on the tape it suffices to adjust the search and lecture control module 31 so as to display the number of said recording, whereafter this module controls the unreeling of the tape of recorder 27, and then the reading of the recording numbers until the desired number is reached, whereupon this number is displayed for checking purposes on module 31. Module 31 may then be actuated so as to cause the magnetic tape recorder 27 automatically to bring the magnetic tape into the position corresponding to the end of the recording concerned. This feature is particularly advantageous for the positioning of the magnetic tape with a view to starting a new recording, since due to this feature the new recording is prevented from altering the preceding recordings.

When selector 35 is set in accordance with the selected recording mode (intermediate frequency or high frequency) this selector will select the intermediate or high frequency sampling sequence of multiplexer 18, and will also commutate on the one hand the intermediate or high frequency circuits of amplifying cells 2a, 2b, 4a and 4b of the analog input stage 1, and on the other hand the low-pass filters 12a, 12b, 12c and 12d (intermediate frequency) or 13a, 13b, 13c and 13d (high frequency) of the low-pass filtering cells 9a, 9b, 9c and 9d of the filtering stage 10; in this case the corresponding digital intermediate frequency or high frequency recording will be obtained.

It will be understood that the scope of the present invention is not limited to the embodiment described and shown, but that it covers, on the contrary, also any variants of said embodiment.

What is claimed is:

1. A recording apparatus for automatically recording digital signals generated from telluric and magnetic detectors during magneto-telluric prospecting, said apparatus comprising:
   an analog input stage comprising a plurality of amplifying cells the number of which is at least equal to the number of said telluric and magnetic detectors, at least one amplifying cell corresponding to each detector;
   a low-pass filtering stage comprising a plurality of filtering cells equal in number to the number of amplifying cells each one of said filtering cells comprising a low-frequency low-pass filter, an intermediate frequency low-pass filter and a high frequency low-pass filter, each one of said filters having a predetermined cut-off frequency, the respective inlets of the low-pass filters of a given filtering cell being sequentially connected to the outlet of the corresponding amplifying cell;
   an analog output stage comprising a plurality of binary gain amplifiers each having an adjustable gain responsive to a binary code, said binary gain amplifiers equal in number to the number of filtering cells, each one of said binary gain amplifiers connected to the outlet of the corresponding filtering cell and producing an amplified analog sample signal and a digital gain signal representing the value of the gain applied to said binary gain amplifiers;
   an analog multiplexer having an adjustable variable sampling sequence and comprising input channels at least equal in number to the number of binary gain amplifiers, the analog sample signal from each one of said binary gain amplifiers being connected to one of said input channels of said multiplexer;
   an analog-to-digital converter the inlet of which is connected to the outlet of the analog multiplexer and producing a first digital signal respresenting the amplitude of the analog sample signal received by the multiplexer, and a second digital signal representing the address of the channel of the multiplexer corresponding to the received sample signal;
   a gain computing module receiving each of the signals produced by the analog-to-digital converter and producing for each of the binary gain amplifiers an optimum gain setting;
   a digital recording system receiving said first and said second digital signals from the analog-to-digital converter; and
   a recording selector connected to the analog multiplexer, at least one of said amplifying cells, and to the filtering cells of the filtering stage, said selector being adapted to select for each one of the recording types comprising low-frequency recording, intermediate-frequency recording and high-frequency recording, the sampling frequency of the analog multiplexer, the gain of said at least one amplifying cells, and the appropriate low-pass filter of each filtering cell.

2. The recording apparatus according to claim 1, wherein said digital recording system comprises a digital multiplexer receiving the first and second signals produced by said analog-to-digital converter as well as the digital gain signal produced by each one of said binary gain amplifiers, said system further comprising a sizing module connected to the outlet of said digital multiplexer, and a magnetic tape recorder for recording, through the intermediary of a buffer memory, information output data produced by said sizing module.

3. The recording apparatus according to claim 2, further comprises a label editing module adapted to provide a distinctive code preceding each individual recording, said label editing module being operationally connected to said digital multiplexer of said digital recording system.

4. The recording apparatus according to claim 2 further comprises a search and reading control module for positioning said magnetic tape recorder for reading said recording or to bring said magnetic tape into its position corresponding to the end of said recording, said module being connected to the digital multiplexer and to the sizing module of the recording system, as well as to the analog-to-digital converter.

5. The recording apparatus according to claim 1 wherein the low-pass filters of the low-pass filtering stage are active filters.

6. The recording apparatus according to claim 1 further comprising a rejection filter connected between said amplifying cells and said filtering cells and adapted to eliminate the signals having a frequency of 50 or 60 Hz.

7. The recording apparatus according to claim 1 wherein the gain computing module for the binary gain amplifier is a module of the type comprising a digital comparator connected to receive the first digital signal of the analog-to-digital converter, which comparator determines on the basis of each digital sample signal received from the converter the value of the gain to be applied with a view to obtaining at the inlet of the multiplexer corresponding to the address of the sample signal an appropriate amplitude signal and producing an output signal representing said value, and further comprising a rotating memory element having a first inlet connected to receive the output signal of the digital comparator, and a second inlet connected to receive the second digital signal of the analog-to-digital converter, the outlet of said memory being operationally connected for adjusting the gain of each one of said binary gain amplifiers, said memory being adapted to identify the binary gain amplifier associated with the input channel of the analog multiplexer from which issues the sample signal received by the digital comparator, and said memory transmitting to the identified binary gain amplifiers an optimum gain setting adapted to cause said amplifier to be set to a gain value corresponding to the value determined by said digital compartor.

8. A recording apparatus according to claim 1 wherein each of said amplifying cells corresponding to said telluric detectors comprises a differential amplifier, and each of said amplifying cells connected to said magnetic detectors comprises a non-differential amplifier having an adjustable gain setable in accordance with the frequency range of signals to be recorded, said recording selector connected to said non-differential amplifiers for setting said gains.

9. The recording apparatus according to claim 8 wherein a stabilized source of direct current is connected through a switch to the outlet of the non-differential amplifier of amplifying cells corresponding to magnetic detectors, the commutation of said direct current source being controlled manually or through the intermediary of the recording selector.

10. The recording apparatus according to claim 8, wherein each amplifying cell corresponding to a telluric detector further comprises, a high-pass filter, a commutating element and a non-difference amplifier the gain of which is adjustable in accordance with the frequency range of the signals to be recorded, said non-difference amplifier being connected through the intermediary of said commutating element to the differential amplifier for low-frequency recording, and to the outlet of the high-pass filter for intermediate-frequency and high-frequency recording said high-pass filter connected to said non-differential amplifier, the outlet of said non-difference amplifier being connected to the inlet of the corresponding filter cell, and the control of said commutating element and the adjustment of the gain of said non-difference amplifier being controlled by the recording selector.

11. The recording apparatus according to claim 10, wherein a stabilized source of direct current is connected through a switch to the inlet of the non-difference amplifier of the amplifying cells connected to telluric detectors, the commutation of the direct current source being effected manually or by the recording selector.

* * * * *